United States Patent [19]
Sakurai

[11] Patent Number: 5,119,211
[45] Date of Patent: Jun. 2, 1992

[54] IMAGE READER FOR AN IMAGE FORMING APPARATUS

[75] Inventor: Tetsuo Sakurai, Sagamihara, Japan

[73] Assignee: Ricoh Company, Ltd., Tokyo, Japan

[21] Appl. No.: 342,356

[22] Filed: Apr. 24, 1989

[30] Foreign Application Priority Data

| Apr. 26, 1988 | [JP] | Japan | 63-102994 |
| Apr. 26, 1988 | [JP] | Japan | 63-102995 |
| Jan. 6, 1989 | [JP] | Japan | 64-967 |

[51] Int. Cl.⁵ .................. H04N 1/38; H04N 1/40
[52] U.S. Cl. ................... 358/464; 358/443; 358/448
[58] Field of Search ........... 358/464, 466, 461, 455, 358/456, 471, 465, 448, 443

[56] References Cited

U.S. PATENT DOCUMENTS

| 4,001,500 | 1/1977 | Lavery et al. | 358/465 |
| 4,539,600 | 9/1985 | Takahashi et al. | 358/464 |
| 4,578,715 | 3/1986 | Yamaguchi | 358/456 |
| 4,694,353 | 9/1987 | Sato et al. | 358/466 |
| 4,868,685 | 9/1989 | Ueno | 358/471 |

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

An image reader installed in an image forming apparatus for reading an image printed on a document and producing a digital video signal representative of the read image. While a CCD image sensor produces an analog signal associated with a document, a background level detector produces a background level signal representative of the density of the background of the document. The background level signal is fed to a reference level input terminal of an analog-to-digital converter. A signal level adjusting circuit is provided for adjusting the ratio between the density of the background of the document and the level of the background level signal. An operation for erasing the background is effected automatically in response to the background level signal. This operation begins after the start of image scanning and, before this operation occurs, the background is erased by using a predetermined fixed level. The time constant of the background level detecting circuit is switchable and is switched over after the start of image scanning. By determining the level of the analog signal from the CCD image sensor, the time constant for background level detection is switched over on the basis of the determined signal level. The image reader erases the background of a document while insuring the production of an image which is printed on the document.

9 Claims, 11 Drawing Sheets

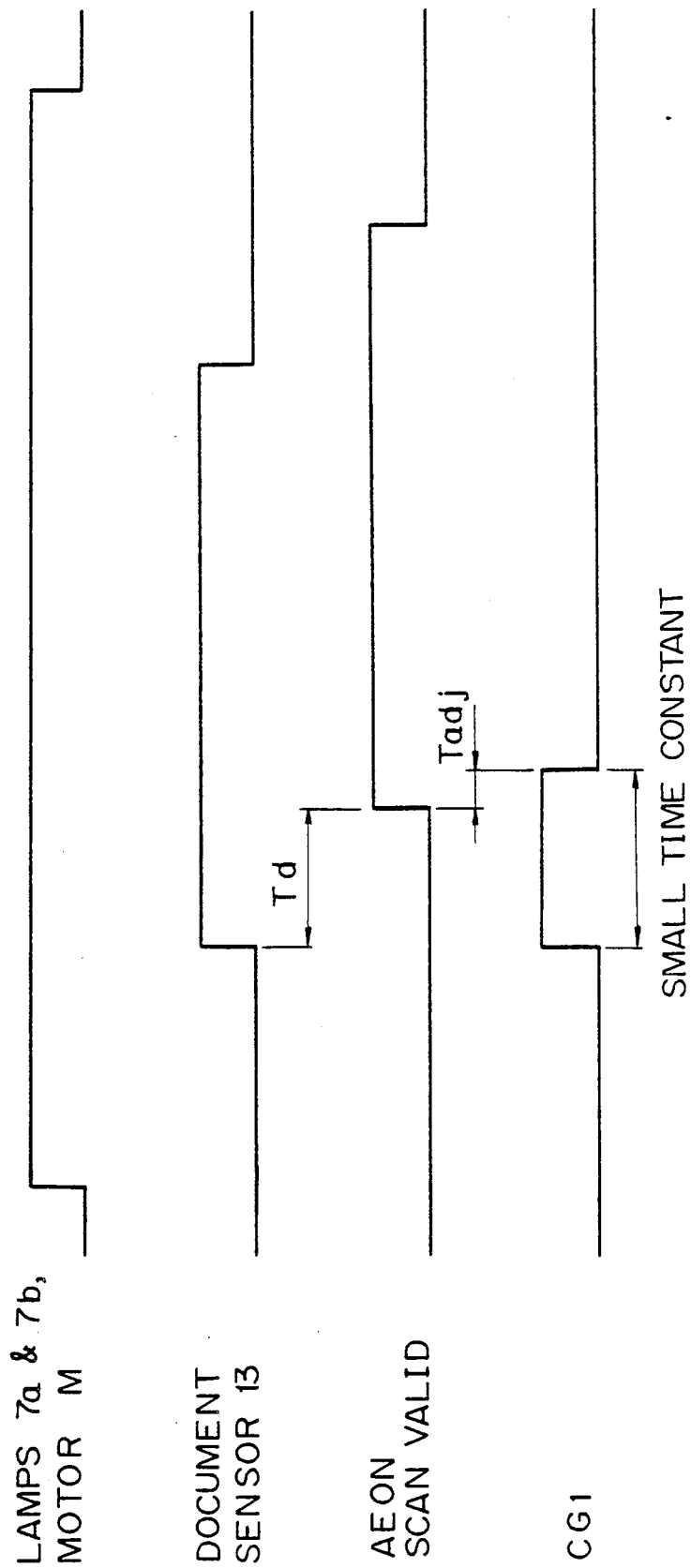

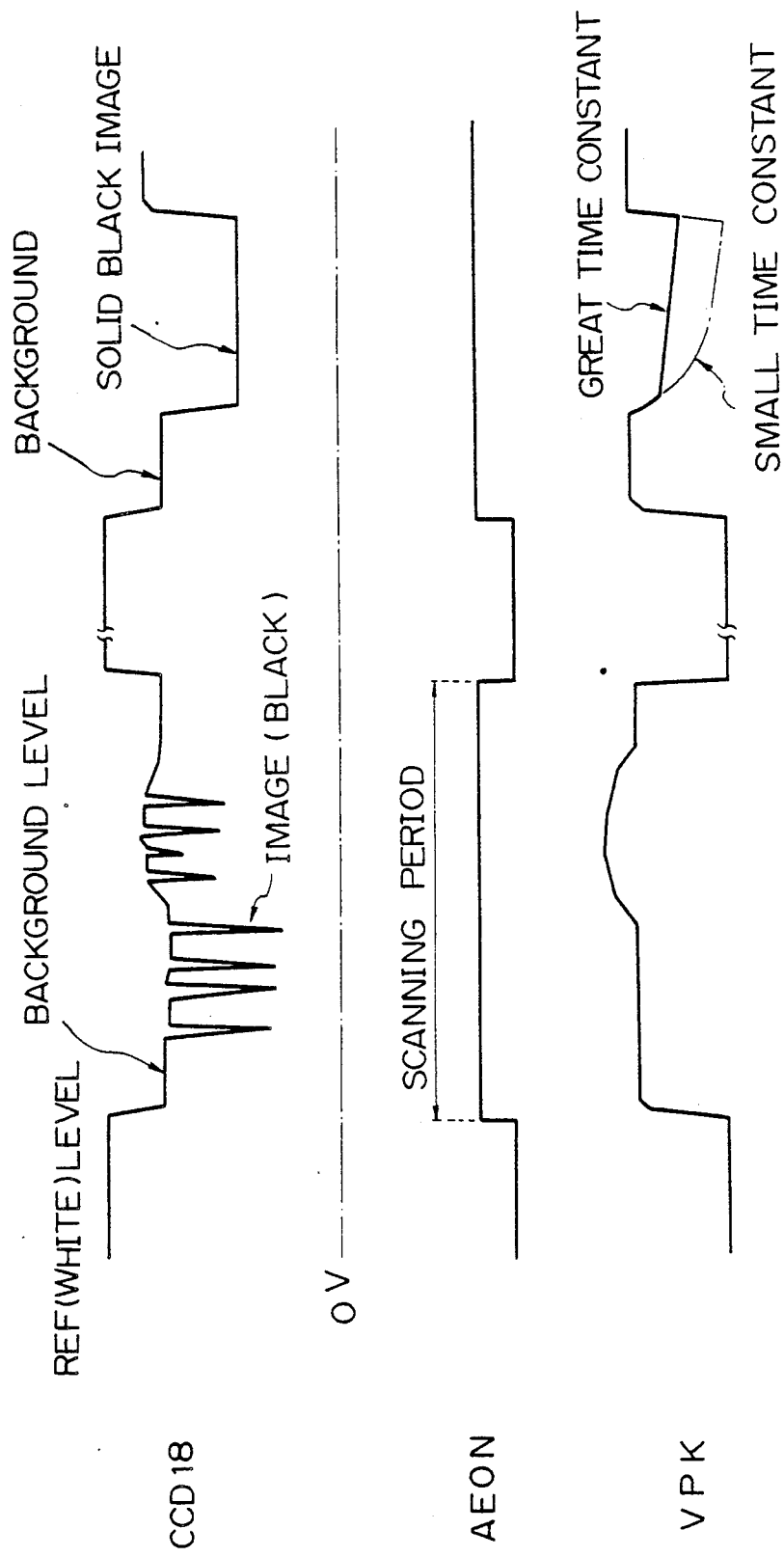

IMAGE READER FOR AN IMAGE FORMING APPARATUS

BACKGROUND OF THE INVENTION

The present invention relates to an image reader applicable to an image forming apparatus for generating a digital video signal representative of an image printed on a document by reading the document. More particularly, the present invention is concerned with an image reader capable of erasing an image associated with the background of a document while reliably preventing an image printed on the document from being omitted.

An eletrophotographic copier, facsimile apparatus, laser printer or similar image forming apparatus has an image reader, or image scanner, which is usually implemented by a one-dimensional image sensor. While main scanning is effected by the iamge sensor which scans a document, subscanning is effected by the relative mechanical scanning of the image sensor and the document. By the main and subscanning, the distribution of image densities on a document is sequentially read. The image densities are delivered in the form of an analog signal, while an analog-to-digial (AD) converter transforms the analog signal into a digital signal. A prerequisite with this kind of apparatus, such as an electrophotographic copier, is that unnecessary images existing on a document be prevented from being reproduced while necessary images are reliably reproduced, i.e., an image associated with the background of a document which is not necessary be erased. To meet this requirement, is has been customary to regard output images, whose densities are lower than a predetermined level, as unnecessary images associated with the background and to convert such images to a zero density level.

The above-described prior art implementation is not satisfactory because the density of a necessary image and that of an unnecessary image vary over a broad range depending upon the kind of a document. For example, a diazo copy has a background having an extremely high density. Concerning a relatively thin document, an image printed on the back is read through the document to constitute an unnecessary image in the background, increasing the density of the background. Conversely, a low-contrast document or a document on which information is additionally written with a pencil has a necessary image which has a relatively low density. Such an image is often treated as an unnecessary image and therefoe lost on a reproduction. When a document is read by ordinary optics, a reflection from the document is reflected again by a light source to contribute to imagewise exposure. Hence, the actual amount of exposure depends upon the reflectance of a document, i.e. the kind of an image printed on a document. For example, the amount of exposure difers by about 10% from a document the entire surface of which is white to a document the entire surface of which is black. As the amount of exposure is changed, the density of an image read by the optics is also changed resulting in the density of an unnecessary image associated with the background being changed in a signal processing system with respect to the signal level. This causes the degree to which the unnecessary image is erased to fluctuate. Specifically, an unnecessary image which may appear in the background after a solid black image which is necessary is sometimes left non-erased. In order to accommodate for changes in the density of a document and thereby to erase an unnecessary image while preventing a necessary image from being lost, a control is possible wherein the densities of a document image are detected to determine a signal level representative of an unnecessary image which exists in the background, and the determined signal level is caused to follow a level which has been determined to be a background signal level by signal processing.

For such a control, use is made of a level detecting circuit which detects the peak level of a video signal which is representative of the background of a document. With this kind of level detecting circuit, it is necessary to increase the negative-going signal level associated with an output image so that the signal level associated with an unnecessary image may be prevented from following that of a necessary image. If follows that upon a transition from a light unnecessary image to a dark unnecessary image both of which exist in the background of a document, the signal level associated with the unnecessary images cannot be detected without a substantial delay. When a document is reproduced by a diazo process, for example, misalignment of the document and a paper sheet causes a leading edge portion of the paper sheet or copy to appear white and the other portion to appear blue. That is, the background density sharply changes on the same copy. When this kind of paper sheet is used as a document to be read, the signal level associated with the background is sharply lowered in the leading edge portion. Then, the level detecting circuit fails to follow the signal level with the result that background is not erased over an image portion of several centimeters which follows the leading edge portion. With a diazo copy, it often occurs that the background density noticeably changes due to irregular printing. Also, the background density of a document undergoes a sharp change when the document is prepared by adhering some cut pieces of paper each having a substantial density to a single paper. With a digital image reader, it is preferable that the background level of a document be determined before AD conversion so as to remove a signal level associated with unnecessary images from a digital image signal. This is successful in minimizing the required number of bits of an AD converter and therefore in simplifying the construction of electrical circuitry.

SUMMARY OF THE INVENTION

It is therefore an object of the present invention to provide an image reader for an image forming apparatus which removes an unnecessary image existing in a background from an image to be outputted while preventing an image which should be outputted from being omitted.

It is another object of the present invention to provide a generally improved image reader for an image forming apparatus.

In accordance with the present invention, there is provided an image reader for an image forming apparatus which reproduces an image printed on a document on a recording medium, comprising image reading means for producing an analog signal associated with a density of an image of an image portion and a density of an image of a background portion of the document, an analog-to-digital (AD) converter having a reference level input terminal to which a reference level signal representative of a reference level is applied, the AD converter converting the analog signal outputted by the image reading means to a digital signal by quantizing the analog signal in response to the reference level signal, a background level detector for producing a background level signal associated with the density of the image of the background portion by processing the analog signal outputted by the image reading means, and for applying the background level signal to the reference level input terminal of the AD converter, and signal level adjusting means for adjusting a ratio between the density of the image of the background portion and a level of the background level signal.

In accordance with the present invention, there is also provided an image reader for an image forming apparatus which reproduces an image printed on a document on a recording medium, comprising image reading means for producing an analog signal associated with a density of an image of an image portion and density of a background portion of the document, image scanning means for scanning a reading position of the image reading means, an AD converter having a reference level input terminal to which a reference level signal representative of a reference level is applied, the AD converter converting the analog signal outputted by the image reading means to a digital signal by quantizing the analog signal in response to the reference level signal, a background level detector for producing a background level signal associated with the density of the image of the background portion by processing the analog signal outputted by the image reading means, signal switching means for selectively applying one of the background level signal produced by the background level detector and a fixed background level signal representative of a fixed level to the reference level input terminal of the AD converter, and a control unit for controlling the signal switching means such that the signal applied to the reference level input terminal of the AD converter is switched over in synchronism with the scanning by the image scanning means and while the scanning is under way.

In accordance with the present invention, there is also provided an image reader for an image forming apparatus which reproduces an image printed on a document on a recording medium, comprising image reading means for producing an analog signal associatd with a density of an image of an image portion and a density of an image of a background portion of the document, image scanning means for scanning a reading position of the image reading means, an AD converter having a reference level input terminal to which a reference level signal representative of a reference level is applied, the AD converter converting the analog signal outputted by the image reading means to a digital signal by quantizing the analog signal in response to the reference level signal, a background level detector for producing a background level signal associated with the density of the image of the background portion by processing the analog signal outputted by the image reading means, and for applying the background level signal to the reference level input terminal of the AD converter, time constant switching means for switching over a time constant for background level detection of the background level detector, and a control unit for controlling the time constant switching means such that the time constant for background level detection of the background level detector is switched over in synchronism with the scanning by the image scanning means and while the scanning is under way.

In accordance with the present invention, there is further provided an image reader for an image forming apparatus which reproduces an image printed on a document on a recording medium, comprising image reading means for producing an analog signal associated with a density of an image of an image portion and a density of an image of a background portion of the document, image scanning means for scanning a reading position of the image reading means, an AD converter having a reference level input terminal to which a reference level signal representative of a reference level is applied, the AD converter converting the analog signal outputted by the image reading means to a digital signal by quantizing the analog signal in response to the reference level signal, a background level detector for producing a background level signal associated with the density of the image of the background portion by processing the analog signal outputted by the image reading means, and for applying the background level signal to the reference level input terminal of the AD converter, time constant switching means for switching over a time constant for background level detection of the background level detector, and a control unit for determining a level of the analog signal outputted by the image reading means and, based on the determined level, switching over the time constant for background level detection of the background level detector while the scanning is under way.

BRIEF DESCRIPTION OF THE DRAWINGS

The above and other objects, features and advantages of the present invention will become more apparent from the following detailed description taken with the accompanying drawings in which:

FIGS. 9, 10, 11 and 12 are timing charts showing specific timings of various signals which appear in the circuitry of FIG. 6.

DESCRIPTION OF THE PREFERRED EMBODIMENT

Figure 1:
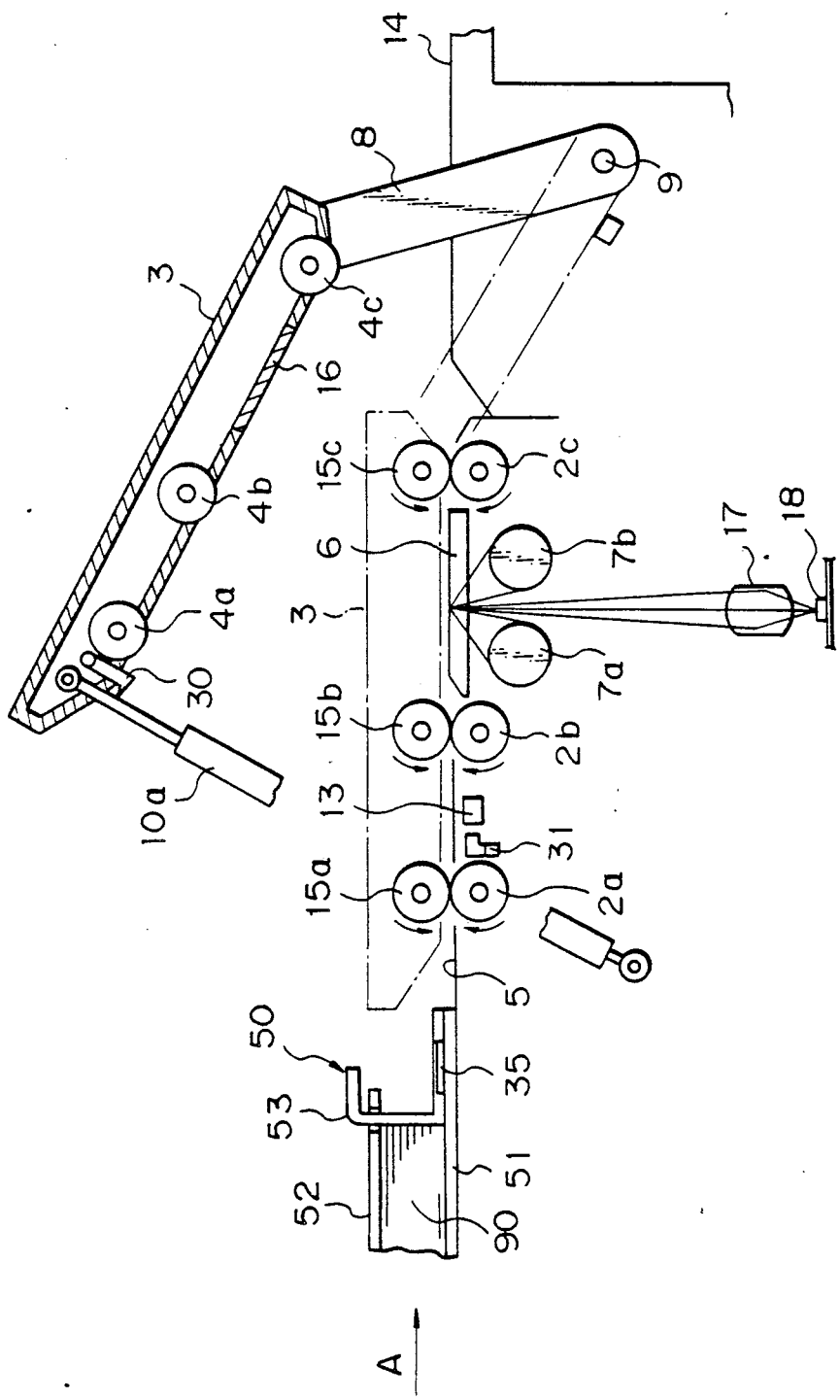
FIGS. 1 and 2 are respectively a front view and a perspective view showing a part of an image scanner representative of an image reader embodying the present invention.
Figure 2:
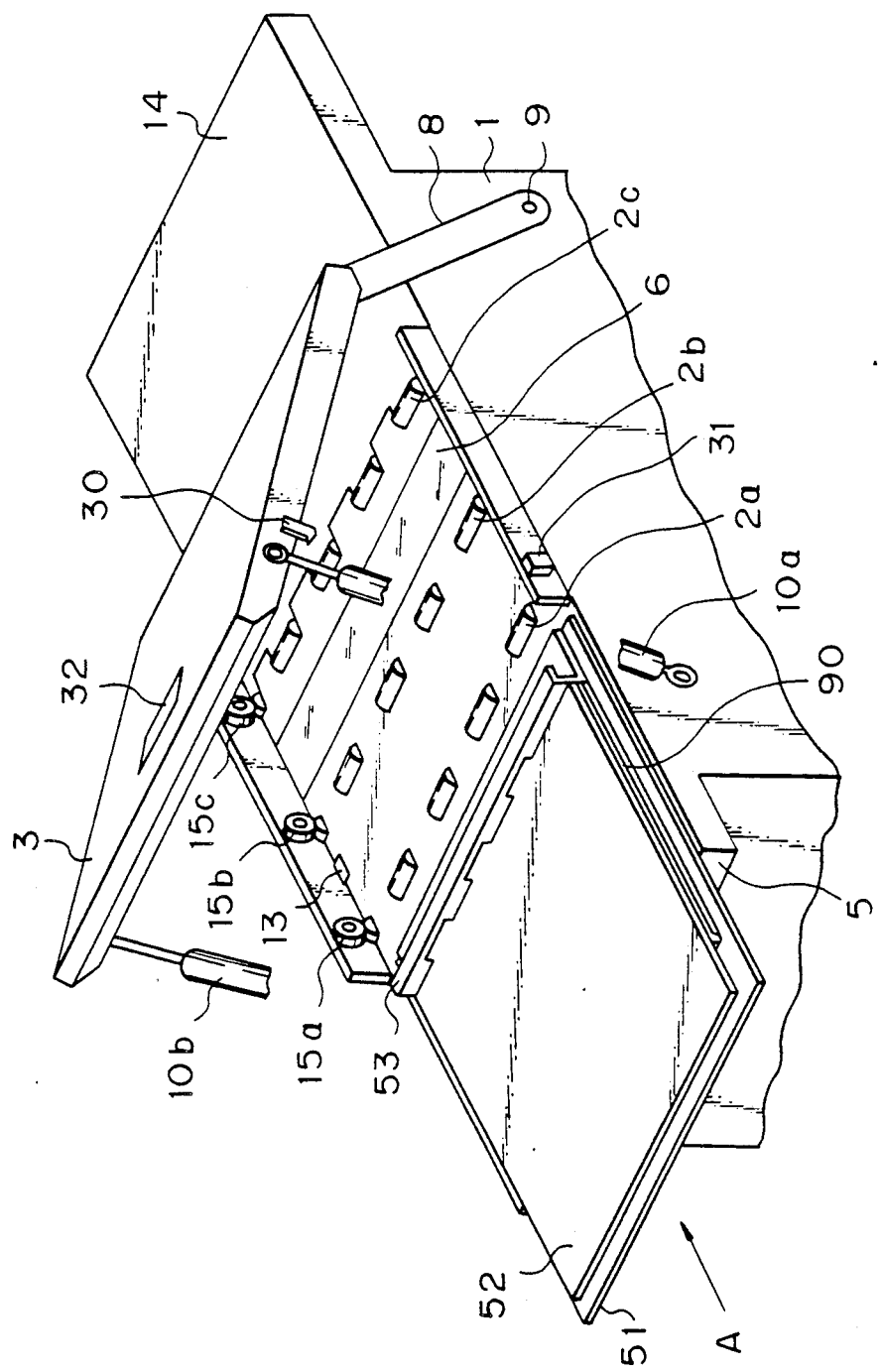

Referring to FIGS. 1 and 2, an image scanner representative of an image reader embodying the present invention is shown and includes a reading section which is fixed in place. A document is laid on a table 5 and transported therefrom in a direction indicated by an arrow A to implement subscanning. The document finally reaches a tray 14 by way of a glass platen 6. Transport rollers 2a, 2b and 2c are located upstream and downstream of the glass platen 6 with respect to the direction A and connected to an electric motor (not shown) to be driven thereby. A top cover 3 is supported at one end by a shaft 9 through arms 8 in such a manner as to be rotatable up and down about the shaft 9. Gas springs 10a and 10b are connected to the other end of the top cover 3 and a body 1 and constantly bias the top cover 3 upward. When the top cover 3 are pressed against the action of the springs 10a and 10b to predetermined position where it faces the glass platen 6, pawls 30 provided on the top cover 3 individually engage with retaining members 31 to hold the cover 3 in the predetermined position. A solenoid SOL which will be described is operatively connected to each of the retaining members 31. When the solenoid SOL is energized, its associated retaining member 31 is moved to release the pawl 30.

when a document to be read is in the form of a sheet, the top cover 3 is located and fixed in a position where it faces the glass platen 6, as indicated by a phantom line in FIG. 1. Driven rollers 4a, 4b and 4c are mounted on the top cover 3 to face respectively the transport rollers 2a, 2b and 2c when the cover 3 is brought to such a position. A document in the form of a sheet is driven by the transport rollers 2a, 2b and 2c their associated driven rollers 4a, 4b and 4c while being held therebetween. Disposed below the glass platen 6 which is transparent are fluorescent lamps 7a and 7b, a focusing lens 17, and an image sensor 18. The image sensor 18 is implemented as a one-dimensional CCD (Charge Coupled Device) image sensor having an array of 5,000 light-sensitive elements which extends in a direction perpendicular to the direction A, i.e. in a main scanning direction. While the lamps 7a and 7b illuminate a document being transported on and along the glass platen 6 (subscanning), a reflection from the document is focused onto a light-sensitive surface of the image sensor 18 by being reduced by the lens 17. A reference density pattern 16 in the form of an elongate strip is provided on the underside of the top cover 3 and extends in the main scanning direction such that it faces the glass platen 6. Painted white, the reference density pattern 16 has a uniform reflectance over the entire surface thereof. The reference density pattern 16 is read by the image sensor 18 at a predetermined timing in order to produce data for shading correction, as described in detail later.

Figure 3:
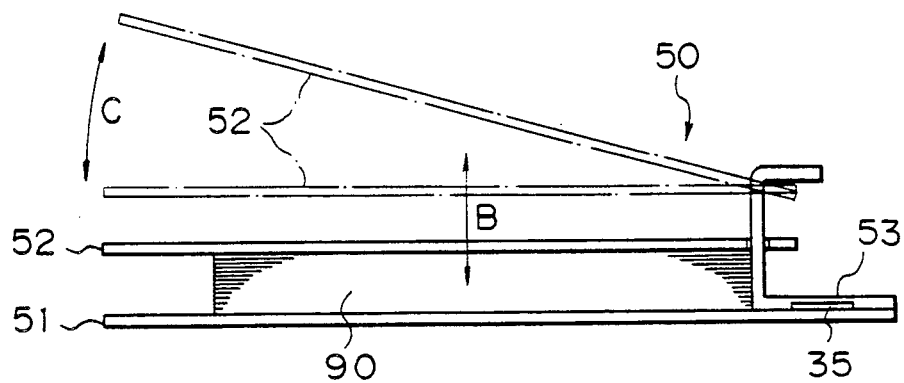
FIGS. 3 and 4 are respectively a front view and a plan view of a book carrier applicable to the image scanner of FIG. 1.
Figure 4:
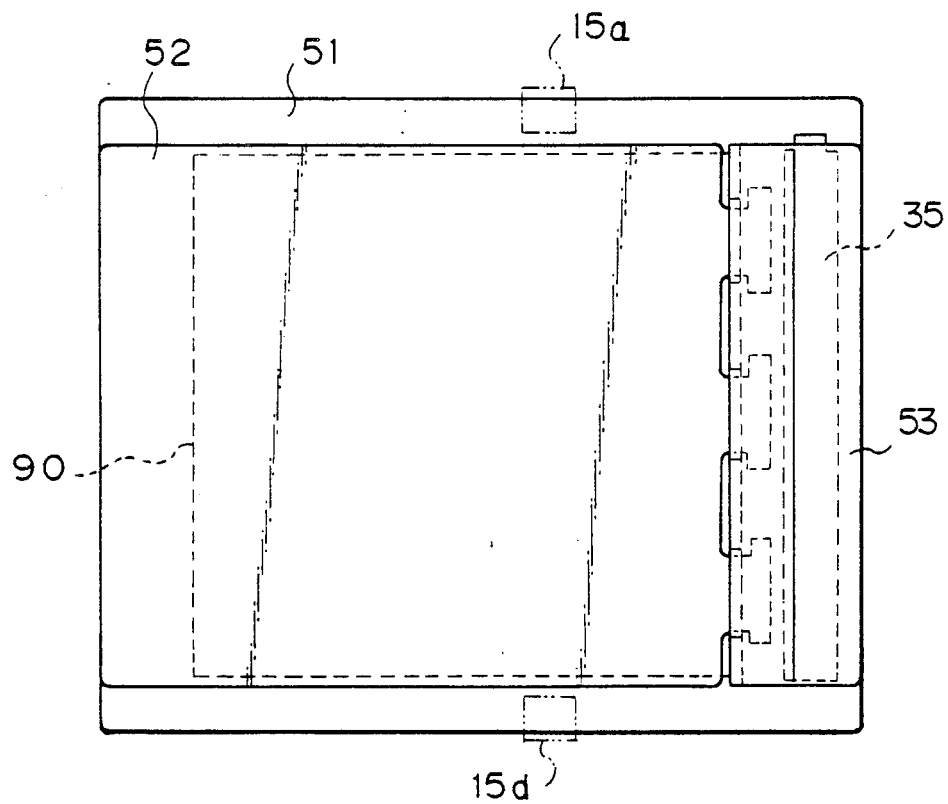

In the illustrative embodiment, the image scanner is capable of reading not only a sheet document but also a document 90 having a substantial thickness such as a book. The thick document 90 to be read is loaded in a book carrier 50. As shown in FIGS. 3 and 4, the book carrier 50 has a transparent carrier sheet 51, a presser plate 52, and a hinge 53. The document 90 is laid on the carrier sheet 51 with its reading surface facing downward. The presser plate 52 is engaged at one end with the hinge 53. In this construction, the presser plate 52 is freely movable in directions indicated by arrows B and C in FIG. 3 so that various kinds of documents may be loaded and pressed from above as desired. The carrier sheet 51 has a width (dimension measured in the main scanning direction) which is greater than those of the document 90 and presser plate 52, so that its opposite ends protrude sideways. This configuration is to allow the book carrier 50 to be bodily transported. When the thick document 90 is to be read, it is necessary to raise the top cover 3 which carries the driven rollers 4a, 4b and 4c therewith. Side rollers 15a, 15b, 15c and so on are located on opposite sides of a transport path along which the carrier sheet 51 is to be moved. The book carrier 50 is transported with its carrier sheet 51 being held between the transport rollers and the side rollers.

Figure 5:
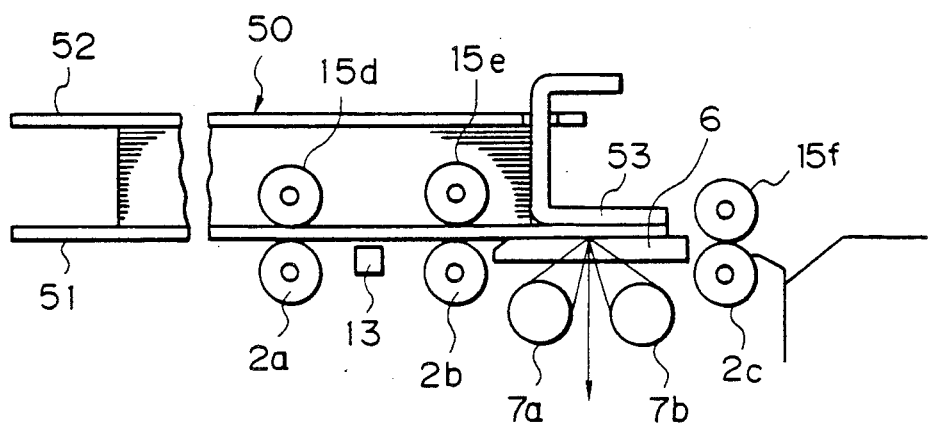
FIG. 5 is a front view of the book carrier being transported on a document table.

As shown in FIG. 5, a document sensor 13 is disposed below the document transport path for sensing the document and the book carrier 50. A knob 32 (FIG. 2) is provided on the upper surface of the top cover 3 to allow one to raise the cover 3 with ease. The knob 32 is movable by a small amount when gripped or released.

Figure 6:
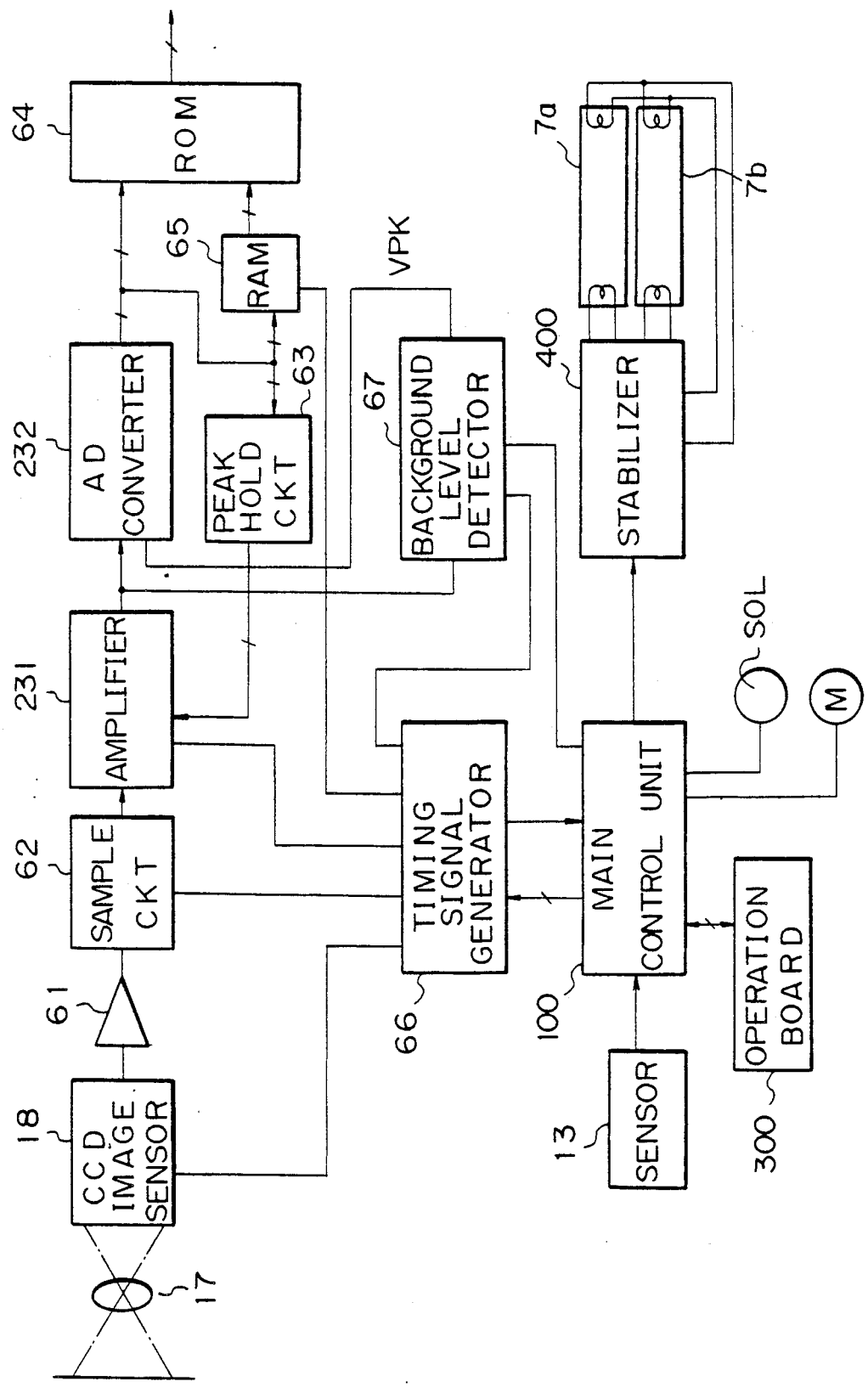
FIG. 6 is a schematic block diagram showing an electrical arrangement of the image scanner shown in FIG. 1.

Referring to FIG. 6, an electrical arrangement of the image scanner is shown. The image sensor 18 produces at its output an electrical signal having relatively low levels (50 mV or so for the white level) and associated with the density distribution of the read image. Since scanning clock signal components of the image sensor are superposed on the electrical signal, or video signal, as noise, a sampling circuit 62 is provided for removing the noise. The video signal outputted by the sampling circuit 62 is routed through an amplifier 231 to an analog-to-digital (AD) converter 232. The amplifier 231 has a variable amplification in order to control the white level of the input video signal to a predetermined value. A peak hold circuit 63 is connected to the output of the AD converter 232 for automatically adjusting the amplification of the amplifier 231.

Also connected to the output of the AD converter 232 are a ROM (Read Only Memory) 64 and a RAM (Random Access Memory) 65 which in combination constitute a shading correction circuit. Specifically, the ROM 64 and RAM 65 are used to correct the scattering in the sensitivity of optics and image sensor 18 of the image scanner in the main scanning direction. More specifically, when the image sensor 18 reads the reference density pattern 16 located in a predetermined position on the image reading surface, one line of data in the main scanning direction are stored in the RAM 65 as shading correction data. The density (tone) level is corrected so as to correct the irregularity in the density of shading correction data which are individually associated with video signals representative of successive main scanning lines. The ROM 60 stores a conversion table which shows all the possible combinations of input video data, shading correction data, and corrected data. Hence, when the shading correction data outputted by the RAM 65 and the input video data outputted by the AD converter 232 are applied to the ROM 64, the ROM 64 produces corrected data.

A background level detector 67 produces a background level signal VPK in response to a video signal which is outputted by the amplifier 231. The signal VPK is adapted to set up the full scale level of the AD converter 232. A timing signal generator 66 produces various timing signals (e.g. clock pulses) to be fed to the image sensor 18, sampling circuit 62, amplifier 231, RAM 65, and background level detector 67. A main control unit 100 controls the operations of the entire image scanner and is implemented by a microcomputer. Specifically, the main control unit 100 reads key inputs on an operation board 300, controls the display of the key inputs, on-off controls a drive motor M for scanning, a solenoid SOL and the light source (lamps 7a and 7b) for imagewise exposure, reads an output of the document sensor 13, controls the timing signal generator 66, and performs other various kinds of control. In FIG. 6, the reference numeral 400 designates a stabilizer associated with the lamps 7a and 7b.

Figure 7:
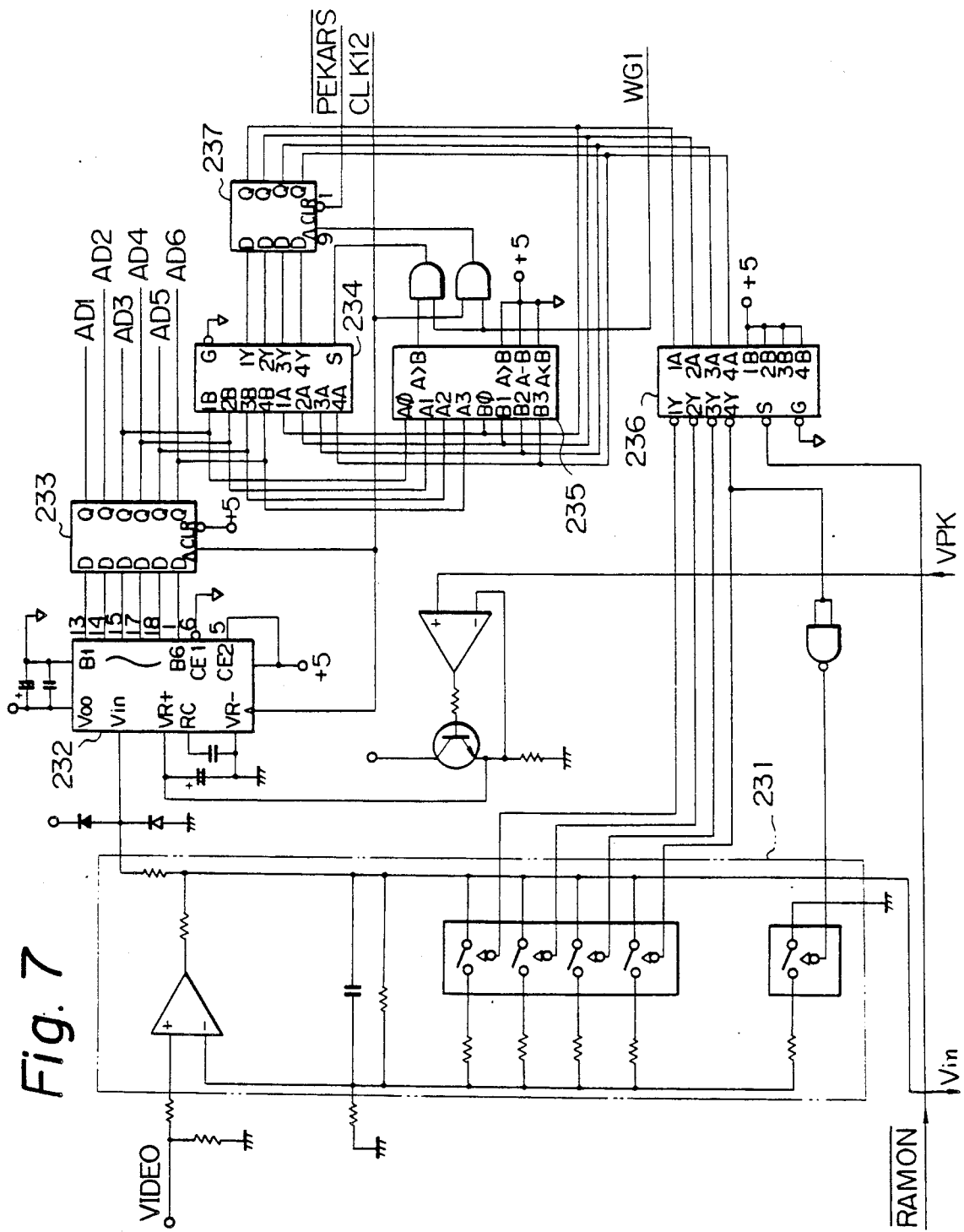
FIG. 7 is a circuit diagam showing a specific construction of a part of the circuitry shown in FIG. 6.

FIG. 7 shows a specific construction of the amplifier 231, AD converter 232, and peak hold circuit 63. As shown, a video signal VIDEO coming out of the sampling circuit 62 is routed through the amplifier 231 to an analog input terminal Vin of the AD converter 232. The AD converter 232 has a 6-bit digital output terminal. The video signal outputted by the AD converter 232 in the form of a 6-bit digital signal is fed out via a latch 233. The peak hold circuit 63 includes a data selector 234, a digital comparator 235, a data selector 236, and a latch 237.

In an operation mode for detecting the peak value of the video signal, the circuitry shown in FIG. 7 is operated as follows. The digital video signal from the latch 233 is held by the latch 237 via the data selector 234. The digital comparator 235 compares the value being held by the latch 237 with the value of the input video signal which has appeared at that time. If the value of the input video signal is smaller than the value being held by the latch 237, the latch 237 is not updated. When the value of the input video signal becomes greater than the value of the latch 237, that value of the input video signal, i.e., the largest value ever provided, is applied to the latch 237 to update the latter. Since a value equivalent to the peak value of the image signal appears while several main scanning lines are scanned, the peak value will have been held in the latch 237 when the scanning completes. The peak value is applied via the data selector 236 to an amplification control terminal of the amplifier 231 for setting up an amplification. More specifically, the amplification of the amplifier 231 is automatically adjusted such that the signal level inputted to the AD converter 232, when the peak level of the video signal has appeared, is equal to a predetermined (full scale) level. In practice, the peak level of the video signal is controlled to a range of 3.8 V to 4.0 V on the analog input terminal of the AD converter 232.

The AD converter 232 has a terminal VR+ for receiving a voltage which defines a reference for quantizing an analog signal level. This reference voltage is therefore selected to provide the full scale level of the AD converter 232. For example, assuming that the reference voltage is 4 V, a full-scale digital output (3 FH: hexadecimal representation) will be produced when 4 V is applied to the analog signal input terminal Vin. More specifically, since 4 V is the saturation level of the AD conversion, digital outputs associated with analog input voltages higher than 4 V are the same as the digital output associated with the analog input voltage of 4 V. In the illustrative embodiment, the greater the reflectance of a document image read by the image scanner, the higher the level of the video signal VIDEO is. It follows that, concerning an ordinary document, the signal level becomes highest when the background of the document is read. Taking this into account, the circuitry of FIG. 7 implements the erasure of a background by detecting a signal level associated with the background and applying the detected signal to the reference voltage terminal VR+ of the AD converter 232. More specifically, a background image is removed from the digital output of the AD converter 232 by using the saturation level of the AD converter 232 for the signal level which is associated with the background level. The background signal VPK has substantially the same level as the voltage applied to the reference voltage terminal VR+ of the AD converter 232. This signal VPK is generated by the background level detector 67 in response to the analog video signal Vin from the amplifier 231.

Figure 8:
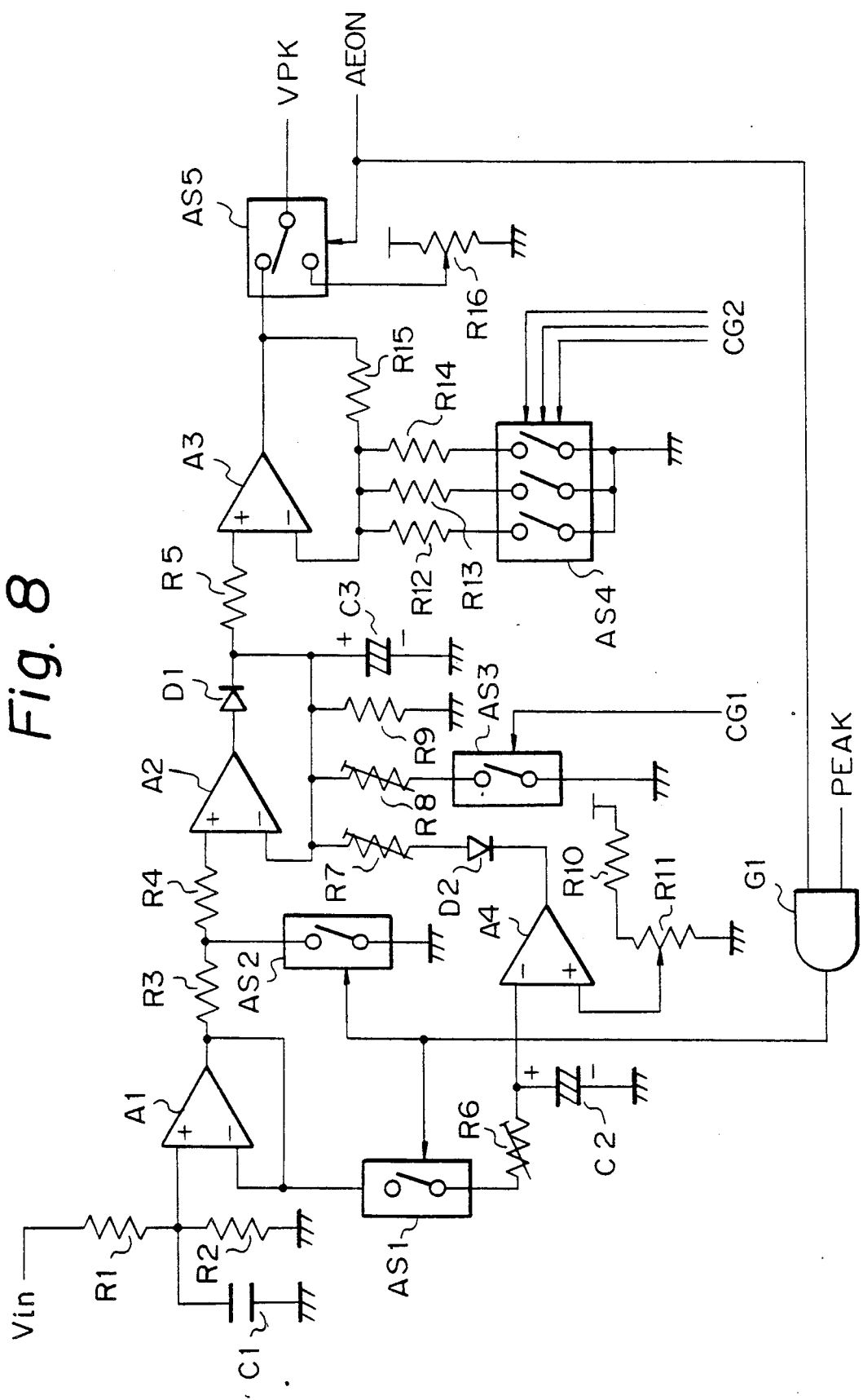
FIG. 8 is a circuit diagram showing a specific construction of a background level detecting circuit shown in FIG. 6.
Figure 9:
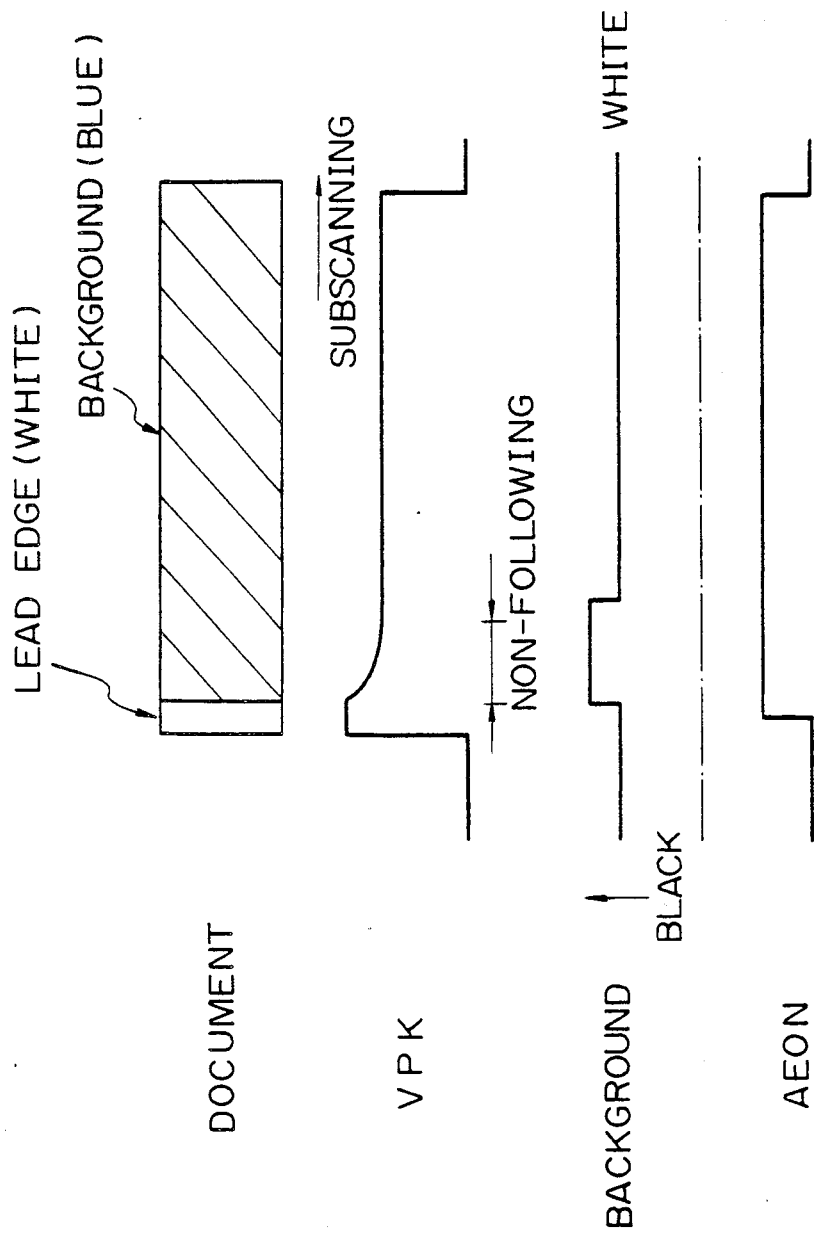

FIG. 8 shows a specific construction of the background level detector 67. As shown, the video signal Vin is fed to a buffer in the form of an operational amplifier (OP AMP) A1 after having its voltage reduced approximately by one half by resistors R1 and R2. By a characteristic particular to the OP AMP A1 itself and the function of a capacitor C1, the video signal passing through the OP AMP A1 has its component having a comparatively high frequency such as one representative of a density change associated with a character, line or similar narrow image damped more than a signal component representative of the background or the like. A signal outputted by the OP AMP A1 is fed to an OP AMP A2 via two resistors R3 and R4, the OP AMP A2 constituting a peak level detector. The operation of the peak level detector is as follows. The OP AMP A2 produces a positive voltage when the voltage applied to its non-inverting input is higher than the voltage applied to an inverting input. When the output voltage of the OP AMP A2 is higher than the terminal voltage of a capacitor C3, it is applied to the capacitor C3 via a diode D1 to increase the terminal voltage of the capacitor C3, i.e. output voltage. Since this output voltage is fed back to the inverting input of OP AMP A2, the terminal voltage of the capacitor C3 stops increasing when the terminal voltage of the capacitor C3 coincides with the input level on the non-inverting input of the OP AMP A2.

When the input level of the OP AMP A2 becomes lower than the terminal voltage of the capacitor C3, the diode D1 is inversely biased and, therefore, the terminal voltage of the capacitor C3 is prevented from following the output voltage of the OP AMP A2. The voltage stored in the capacitor C3 is lowered little by little over a relatively long period of time on the basis of the time constant of a special discharging circuit which includes the capacitor C3 and a resistor R9, unless the capacitor C3 is charged. Thus, the output voltage of the peak level detector follows an increase in the input level immediately, but it does not follow a decrease in the input level and constantly maintains a voltage corresponding to the peak input level. Stated another way, the discharging circuit of the peak level detector has a variable time constant. Specifically, the connection of a resistor R8 to the discharging circuit is turned on and off in response to the turn-on and turn-off of an analog switch AS3, changing the discharging time constant. Also, the connection of a resistor R7 to the discharging circuit is turned on and off in response to the turn-on and turn-off of the output voltage of an OP AMP A4, changing the discharging time constant. The OP AMP A4 serves as an analog comparator. As the discharging time constant is changed, the manner in which the peak level detector follows a decrease in the input level, i.e., a change in the image density from light to dark is varied.

The OP AMP A4 compares the level of the input video signal with a fixed level which is fed from a variable resistor R11. Specifically, the fixed level is selected to be about 1 V so that the background level and the image level (black level) are identified in distinction from each other in terms of two levels. For example, even with a copy produced by a diazo process or similar document whose background has a high density, the level of a video signal associated with the background is 3 V or so. It is therefore clear that a video signal of 1 V or so is representative of a black image to be recorded. The background level should not follow such a black image. Hence, in the illustrative embodiment, the time constant for background level detection is changed over by the output of the OP AMP A4. Specifically, when a signal representative of an image to be recorded does not appear, the level on the inverting input of the OP AMP A4 is higher than the level on the non-inverting input so that the output of the OP AMP A4 has a low level. This biases the diode D2 forward and thereby connects the resistor R7 to the discharging circuit, whereby the time constant is reduced to improve the response in background level detection. Upon the appearance of an image to be recorded, the video signal level becomes lower than 1 V and, therefore, the voltage on the inverting input of the OP AMP A4 becomes lower than the voltage on the non-inverting input. As a result, the output level of the OP AMP A4 turns from low to high to inversely bias the diode D2 so that the resistor R7 is disconnected from the discharging circuit. Eventually, the time constant is increased to slow down the response in background level detection, preventing the background level from following the image which should be recorded.

When the analog switch AS1 is turned off, no video signal is applied to the inverting input of the OP AMP A4 and, hence, the output of the OP AMP A4 is in a high level to increase the discharging time constant. The output signal of the peak level detector is applied to an amplifier which is constituted by an OP AMP A3. Three resistors R12, R13 and R14 are connected to a feedback circuit associated with the amplifier A3, and they are connected to ground via an analog switch AS4. The amplification of the amplifier A3 is therefore variable in four consecutive steps depending upon the on-/off condition of the analog switch AS4. The output signal of the OP AMP A3 is fed to one input terminal of an analog switch AS5. Applied to the other input terminal of the analog switch AS5 is a fixed voltage which is produced by a variable resistor R16. The analog switch AS5 selects either one of the output voltage of the OP AMP A3 and the output voltage of the variable resistor R16 and delivers it as the background level signal VPK.

In FIG. 8, signals PEAK and AEON are the outputs of the timing signal generator shown in FIG. 6, while signals CG1 and CG2 are the outputs of the main control unit also shown in FIG. 6. Specifically, the signal AEON is used to control the ON/OFF of automatic background erasure. When the signal AEON is OFF, the analog switch AS5 shown in FIG. 8 delivers the fixed voltage from the variable resistor R16 in the form of the background level signal VPK and, therefore, the background level remains constant. In a usual operation mode, the signal turns from OFF to ON when a scanning position on a document which is 3 mm inward of the leading edge is reached. More specifically, the background density level is fixed at the level which is set up by the resistor R16, until it has been decided that an image printed on a document has started to be scanned. Immediately after the start of scanning of the image, the state of the analog switch AS5 is switched over by the control signal AEON so that the output signal of the OP AMP A3, i.e., a background density level detected from the actual video signal is delivered in the form of the background level signal VPK. Hence, after the automatic background erasure has been turned on, the image density to be subjected to image erasure changes with the background density actually detected.

Assume that a document to be reproduced by a diazo copier is misaligned with a paper sheet. Then, a white area (low density area) is produced in a leading edge portion of the paper sheet, while the remaining major area of the paper sheet has a blue background having a relatively high density. When the automatic background erasure is turned ON at the instant when the image scanner has scanned such a diazo copier as far as a position 3 mm inward of the leading edge as previously stated, the background density associated with the scanning position sharply changes from a low density to a comparatively high density thereafter. This brings about the following problem. Specifically, the peak level detector responsive to a background level is constructed to respond to a change in the signal from a low level to a high level immediately and to respond to a change of the signal from a high level to a low level slowly so as not to follow level changes in an image to be recorded. Hence, as the actual background level is changed from a low density (high signal level) to a high density (low signal level), the peak level detector fails to immediately follow the background level. During such a delay, the background cannot be erased.

Figure 10:
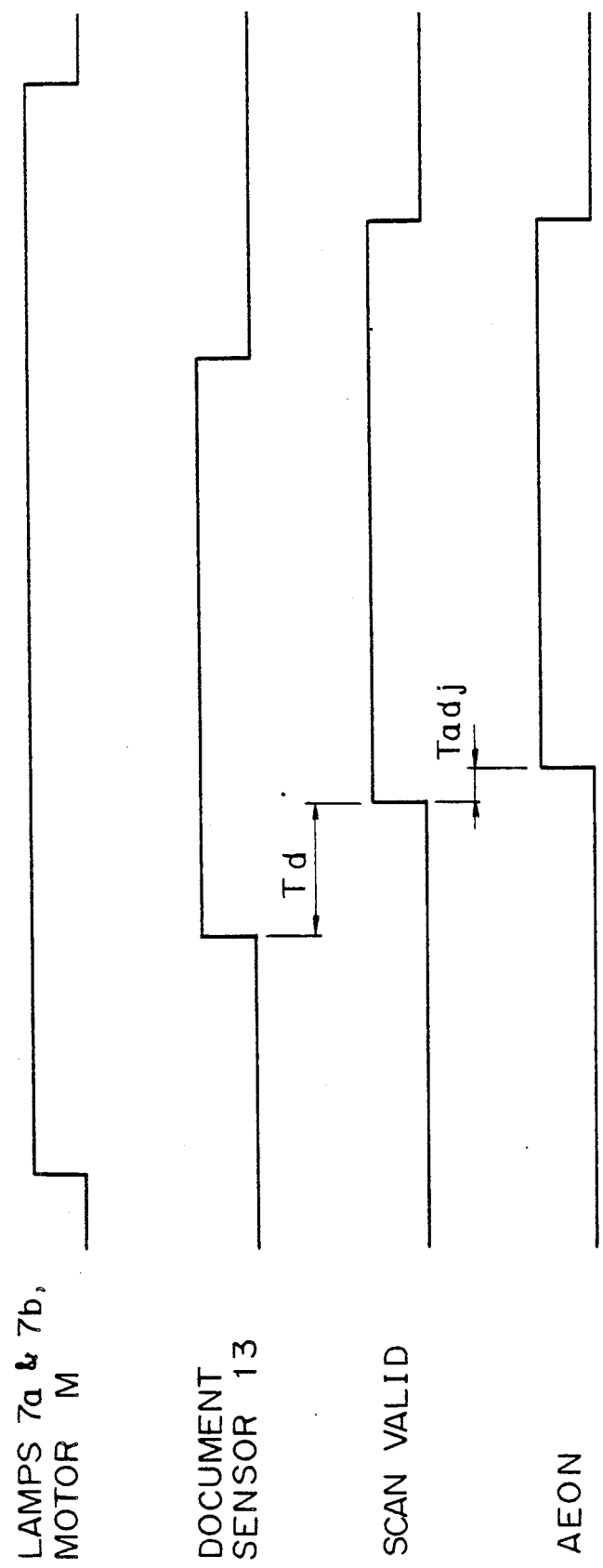

In the light of the above, the illustrative embodiment is constructed and arranged such that the timing for starting automatic background erasure, i.e., the timing for turning the signal AEON from OFF to ON is variable in relation to a scanning position on a document, as desired. Specifically, as shown in FIG. 10, the signal AEON ON timing can be delayed by any desired period of time Tadj relative to the usual timing by manipulating the operation board 300. Assuming a document whose background density is low over an area of 10 mm adjacent to the leading edge and comparatively high in the other area, the signal AEON may be turned from OFF to ON as a position on the document more than 10 mm away from the leading edge is reached. This successfully frees the background density to which the peak level detector is responsive from a sharp change, thereby eliminating incomplete background erasure otherwise caused by the delay. The illustrative embodiment has another operation mode, i.e., it is capable of switching over the time constant of the peak level detector (corresponding to the level holding time) by controlling the analog switch AS3. When the time constant is great, a sharp change in the background level of the video signal from low to high would bring about a substantial delay as previously discussed. The delay will be successfully reduced by reducing the time constant.

In detail, the image scanner is capable of automatically switching over the control signal CG1 while automatic background erasure is under way, and allows one to manipulate the operation board 300 for setting up a desired timing for so switching over the control signal CS1. As shown in FIG. 11, immediately after the control signal AEON has been turned from OFF to ON, the signal CG2 has an ON level to turn on the analog switch AS3. In this condition, the resistor R8 is connected to the discharging circuit to maintain a small time constant and therefore rapid response. Hence, even if the background level of the video signal undergoes a sharp change from a high level (low density) to a low level (high density), the response to the background level is little delayed.

Further, when a document has a background having an irregular density distribution or has a plurality of cut pieces of paper each having a different background density adhered thereon, the background density is apt to sharply change even in the areas of the document other than the leading edge. In such a case, the response to the background level cannot be eliminated by the above-described two different operation modes alone. In this particular embodiment, the peak level detector is provided with a relatively small time constant so that no substantial delay may occur upon the change in the background level of the video signal from high to low. This, however, brings about another problem that the detection level is apt to follow even an image to be recorded and, especially, there is a fear that an image to be outputted is lost when the image has a large area and a high density. This embodiment overcomes this problem by the circuitry for distinguishing the black level of an image and the background level and the major component of which is the OP AMP A4. Specifically, when a low level (black level: lower than 1V) continues over such a long period of time that the output of the peak level detector, i.e., detected background level follows the black level of an image to be recorded, the output level of the OP AMP A4 turns from low to high to inversely bias the diode D2 resulting in the resistor R7 being disconnected from the discharging circuit. Consequently, the time constant of the peak level detector is increased to prevent the detected background level from following the black level (image), whereby the omission of an image is eliminated.

In general, various kinds of documents are selectively used as an image to be inputted, and the density of an image which should be erased as a background is dependent upon the kind of a document. Concerning a newspaper or similar thin document, for example, an image printed on the back of the document will be read together with an image on the front. On the other hand, an image written on a paper sheet with a pencil is often lost on a reproduction due to the low contrast. In accordance with the illustrative embodiment, the amplification of the amplifier the major component of which is the OP AMP A3 and, therefore, the background level to be detected is variable to cope with the change in the document image. Specifically, keys (not shown) provided on the operation board 300 are accessible for specifying any one of three kinds of documents. The signal CG2 is switched over in response to the key input to in turn switch over the sate of the analog switch AS4, whereby the amplification of the OP AMP A3 is changed. More specifically, a first key sets up a 1.5 times greater amplification which increases the background level signal VPK to about 3 V relative to the standard image; a second key sets up a 1.8 times greater amplification which increases the signal VPK to about 3.6 V; and a third key sets up a 2 times greater amplification to increase the signal VPK to about 4 V. When the first key is operated, the background level is lowered so that an image printed on the back of a newspaper or similar thin document is prevented from being inputted as noise or contamination. When the third key is pressed, the background level is raised so that a low-contrast image such as an image written with a pencil is prevented from being lost.

In the circuitry of FIG. 8, the resistance of the variable resistor R7 is selected to be substantially ½ to 1/10 of the resistance of the resistor R9. The signal PEAK applied to the circuitry of FIG. 8 is representative of the effective duration of background level detection and is produced by the timing signal generator 66. In this embodiment, since a document is positioned by using the center of the reading area with respect to the main scanning direction as a reference, the signal PEAK is in an effective level (H) at the timing when an image signal associated with a 50-mm width of the center in the main scanning direction and is in an ineffective level (L) at the other timings.

In summary, it will be seen that the present invention provides an image reader which selects a particular reference level for an AD converter on the basis of a detected background level of a document and, therefore, produces a digital video signal having the background erased without resorting to a complicated construction. Since the ratio between the background level of a document and the reference level for the AD converter is adjustable, there can be eliminated undesirable occurrences that an image printed on the back of a thin document is read together with an image on the front, that a low-contrast image is lost on a reproduction, etc. Further, even when the background density sharply changes from low to high in a leading edge portion of a document, for example, the background image is prevented from being outputted while the image which should be outputted is prevented from being omitted.

Various modifications will become possible for those skilled in the art after receiving the teachings of the present disclosure without departing from the scope thereof.

What is claimed is:

1. An image reader for an image forming apparatus which reproduces an image printed on a document on a recording medium, comprising:

image reading means for producing an analog signal associated with a density of an image of an image portion and a density of a background portion of the document;

image scanning means for scanning a reading position of said image reading means;

analog-to-digital converting means having a reference level input terminal to which a reference level signal representative of a reference level is applied, said converting means converting the analog signal outputted by said image reading means to a digital signaly by quantizing the analog signal in response to the reference level signal;

background level detecting means for producing a background level signal associated with the density of the background portion by processing the analog signal outputted by said image reading means, and for applying the background level signal to said reference level input terminal of said analog-to-digital converting means;

time constant switching means for switching over a time constant for background level detection of said back-ground level detecting means; and control means for controlling said time constant switching means such that the time constant for background level detection of said background level detecting means is switched over in synchronism with the scanning by said image scanning means while the scanning is under way;

wherein the time constant is switched over when the image scanning means has reached a scanning position on the document a predetermined distance away from the leading edge of the document.

2. An image reader as claimed in claim 1, in which said predetermined distance is variable by manipulating an operation board of the image forming apparatus.

3. An image reader as claimed in claim 1, in which the time contant is increased when a level of the image of the image portion is lowered than a fixed level and is reduced when the image level is higher than the fixed level.

4. An image reader for an image forming apparatus which reproduces an image printed on a document on a recording medium, comprising:

- image reading means for producing an analog signal associated with a density of an image of an image portion and a density of a background portion of the document;
- image scanning means for scanning a reading position of said image reading means;
- analog-to-digital converting means having a reference level input teminal to which a reference level signal representative of a reference level is applied, said converting means converting the analog signal outputted by aid image reading means to a digital signal by quantizing the analog signal in response to the reference level signal;
- background level detecting means for producing a background level signal associated with the density of the background portion by processing the analog signal outputted by said image reading means, and for applying the background level signal to said reference level input terminal of aid analog-to-digital converting means;
- time constant switching means for switching over a time constant for background level detection of said background level detecting means; and
- control means for determining a level of the analog signal outputted by said image reading means and, based on the determined level, switching over the time constant for background level detection of said background level detecting means while the scanning is under way;
- wherein the time constant is switched over when the image scanning means has reached a scanning position on the document a predetermined distance away from the leading edge of the document.

5. An image reader as claimed in claim 4, in which said predetermined distance is variable by manipulating an operation board of the image forming apparatus.

6. An image reader as claimed in claim 4, in which the time constant is increased when a level of the image of the image portion is lower than a fixed level and is reduced when the image level is higher than the fixed level.

7. An image reader for an image forming apparatus which reproduces an image printed on a document on a recording medium, comprising:

- image reading means for producing an analog signal associated with a density of an image of an image portion and a density of a background portion of the document;
- image scanning means for scanning a reading position of said image reading means;
- analog-to-digital converting means having a reference level input terminal to which a reference level signal representative of a reference level is applied, said converting means converting the analog signal outputted by said image reading means to a digital signal by quantizing the analog signal in response to the reference level signal;
- background level detecting means for producing a background level signal asociated with the density of the background portion by processing the analog signal outputted by said image reading means, and for applying the background level signal to said reference level input terminal of said analog-to-digital converting means;
- said background level detecting means comprising a first background level signal generator for generating a first background level signal which is derived from the analog signal of the image reading means, a second background level signal generator for generating a second background level signal having a fixed level and a selector for selecting either one of said first and second background level signals and delivering said selected one as said background level signal, said selector functioning to select said second background level signal when the image scanning means has reached a scanning position on the document a predetermined distance away from the leading edge of the document.

8. An image reader as claimed in claim 7, wherein said predetermined distance is variable by manipulating an operation board of the image forming apparatus.

9. An image reader as claimed in claim 7, wherein said background level detecting means further comprises a time constant generator for generating a time constant for background level detection and a time constant switch for switching over said time constant such that said time constant is increased when a level of the image of the image portion is lowered than a fixed level and is reduced when the image level is higher than the fixed level.

* * * * *